(12) United States Patent
Jalonen

(10) Patent No.: US 7,512,084 B2
(45) Date of Patent: Mar. 31, 2009

(54) EVENT DRIVEN FILTER MONITORING FOR IP MULTICAST SERVICES

(75) Inventor: Esa Jalonen, Espoo (FI)

(73) Assignee: Nokia Corporation, Espoo (FI)

(*) Notice: Subject to any disclaimer, the term of this patent is extended or adjusted under 35 U.S.C. 154(b) by 1156 days.

(21) Appl. No.: 10/226,883

(22) Filed: Aug. 23, 2002

(65) Prior Publication Data
US 2005/0120378 A1    Jun. 2, 2005

Related U.S. Application Data

(63) Continuation-in-part of application No. 09/995,547, filed on Nov. 28, 2001.

(51) Int. Cl.
*H04H 20/71* (2008.01)
*H04L 12/56* (2006.01)

(52) U.S. Cl. .............. 370/312; 370/390; 370/432; 455/3.02

(58) Field of Classification Search .......... None
See application file for complete search history.

(56) References Cited

U.S. PATENT DOCUMENTS

| | | | |
|---|---|---|---|
| 5,884,033 A | 3/1999 | Duvall et al. | |
| 6,128,298 A | 10/2000 | Wootton et al. | |
| 6,131,053 A * | 10/2000 | Nyffenegger et al. | 700/220 |
| 6,176,151 B1 | 1/2001 | Cymbal | |
| 6,331,983 B1 | 12/2001 | Haggerty et al. | |
| 6,341,130 B1 | 1/2002 | Lakshman et al. | |
| 6,385,647 B1 * | 5/2002 | Willis et al. | 709/217 |
| 6,389,475 B1 * | 5/2002 | Speakman et al. | 709/232 |
| 6,430,183 B1 | 8/2002 | Satran et al. | |
| 6,611,863 B1 | 8/2003 | Banginwar | |
| 6,968,394 B1 * | 11/2005 | El-Rafie | 709/245 |
| 7,013,482 B1 | 3/2006 | Krumel | |

(Continued)

FOREIGN PATENT DOCUMENTS

WO    WO 01/19029    3/2001

(Continued)

OTHER PUBLICATIONS

PCT International Search Report, International Application No. PCT/IB02/04919, Date of Completion of Search—Dec. 28, 2003, Sheets 1, Continuation of First Sheet, 2 and Continuation of Second Sheet.

(Continued)

*Primary Examiner*—Wing F Chan
*Assistant Examiner*—Robert C Scheibel
(74) *Attorney, Agent, or Firm*—Locke Lord Bissell & Liddell LLP

(57) ABSTRACT

Event driven methods for implementing or removing a filter used in receiving a multicast transmission are disclosed. An exemplary method for implementing a filter includes: detecting a message, such as an IPv6 MLD message, wherein the message comprises an address of a multicast group and a request to join the multicast group to receive a multicast transmission; in response to detecting the message, determining a filter parameter (e.g., a PID number and/or MAC address) needed to receive the multicast transmission; and implementing the filter parameter to receive the multicast transmission. Alternative methods wherein filter implementation or removal is based on the detection of direct procedure calls, such as a Setsockopt call, are also disclosed.

84 Claims, 9 Drawing Sheets

U.S. PATENT DOCUMENTS

| | | | |
|---|---|---|---|
| 7,042,865 | B1* | 5/2006 | Meier et al. ............... 370/338 |
| 2002/0032800 | A1 | 3/2002 | Puuskari et al. |
| 2002/0087999 | A1 | 7/2002 | Kashima |
| 2002/0099857 | A1* | 7/2002 | Lowe et al. ............... 709/250 |
| 2002/0150094 | A1* | 10/2002 | Cheng et al. ............... 370/389 |
| 2002/0176387 | A1* | 11/2002 | Wilmer et al. ............... 370/338 |
| 2002/0184643 | A1 | 12/2002 | Fichet |
| 2003/0073453 | A1* | 4/2003 | Basilier ............... 455/503 |
| 2003/0108043 | A1 | 6/2003 | Liao |
| 2003/0166392 | A1 | 9/2003 | Laiho et al. |
| 2004/0151185 | A1 | 8/2004 | Boursier et al. |
| 2005/0232272 | A1* | 10/2005 | Deng ............... 370/390 |

FOREIGN PATENT DOCUMENTS

| | | |
|---|---|---|
| WO | WO03034658 | 4/2003 |

OTHER PUBLICATIONS

Conta, A. et al., "Internet Control Message Protocol (ICMPv6) for the Internet Protocol Version 6 (IPv6) Specification", Network Working Group, RFC 2463, Dec. 1998, pp. 1-18.

Deering, S. et al., "Multicast Listener Discovery (MLD) for IPv6", Network Working Group, RFC: 2710, Oct. 1999, pp. 1-22.

Fenner, W., "Internet Group Management Protocol, Version 2", Network Working Group, RFC: 2236, Nov. 1997, pp. 1-24.

S. Deering et al., "Multicast Listener Discovery (MLD) for IPv6", Network Working Group, RFC 2710, Standards Track, Oct. 1999, pp, 1-22.

"Digital Video Broadcasting (DVB); Interaction channel for Digital Terrestrial Television (RCT) incorporating Multiple Access OFDM", European Broadcasting Union, Draft ETSI EN 301 958, V1.1.1, Aug. 2001, pp. 1-161.

"Digital Video Broadcasting (DVB); Interaction channel for Satellite Distribution Systems; Guidelines for the use of EN 301 790", European Broadcasting Union, ETSI TR 101 790, V1.1.1, Sep. 2001, pp. 1-222.

Quinn, Bob et al., "Windows Sockets Network Programming", Chapter 16: Optional Features, pp. 1-19.

Supplementary European Search Report for EP Application No. EP 02 78 3421.

Quinn, Bob et al., "Windows Sockets Network Programming", Chapter 16: Optional Features, pp. 1-19, Oct. 6, 2001.

Supplementary European Search Report for EP Application No. EP 02 78 3421, Mar. 2007.

\* cited by examiner

US 7,512,084 B2

EVENT DRIVEN FILTER MONITORING FOR IP MULTICAST SERVICES

RELATED APPLICATIONS

This application is a continuation-in-part of U.S. application Ser. No. 09/995,547, filed Nov. 28, 2001.

FIELD OF THE INVENTION

This invention relates to the implementation of a filter in a digital broadcast receiver, and more particularly to a method to activate such a filter in a DVB-T receiver in a way that is independent from the client software desiring access to the data.

BACKGROUND OF THE INVENTION

Digital video and audio signals, synchronized in the form of a program (or service), can be transmitted over a network as multicast data. In a multicast network, such as DVB-T, a transmitting terminal typically distributes data to the network so that any receiving node wishing to receive a given data service may subscribe to it. In this manner, the transmitting terminal does not establish point-to-point links between a plurality of receiving nodes; one copy of broadcasting data is transmitted, and multiple receivers each can view the same material. An advantage a multicast network protocol has over other data distribution network protocols is that the relatively large amount of data needed to transmit motion pictures or the like is only sent to switching nodes on the network once, and then forwarded to various receiving terminals along the network.

Each digital data service broadcast from the transmitting terminal is segmented into a Packetized Element Stream. In a multicast system, multiple data services are typically transmitted onto the same communication media or channel. Each transport stream packet in this channel contains header information and a payload with multicast service data, for instance, parts of a movie. Receiving terminals use the header information to reassemble the packets carrying the desired service and to discard unwanted packets.

While a multicast protocol eliminates the need for the transmitting terminal to manage multiple connections and reduces the need for the network to handle a flood of redundant data, multicast receiving nodes require a more sophisticated method to sort relevant data than do point-to-point network nodes. As discussed above, a large number of services may be multiplexed onto the same data channel, posing a significant load on the network protocol stack of each receiving terminal that must sort the data. A challenge for receiving nodes is to sort the plurality of available data packets and determine and accept desired data while ignoring unwanted packets.

The solution to deal with this limitation is for a receiving node to use a dual inspection to insure accurate delivery of packets. Tables located in each receiving node track information related to each packet, notably the program identifier (PID) and the DVB media access control (MAC) address. When client software at the receiving node initiates a request for a service, the receiver applies a filter to inspect a data channel for multicast data. The filter initially uses network interface hardware to examine the PID field of the header, which contains enough information to eliminate most unwanted packets. After a packet has been promoted into the protocol stack based on the information in the PID field, software examines the MAC address of each packet to determine if it is indeed part of the desired service. While this system is not perfect, it does accomplish a significant reduction in software packet analysis.

In order to successfully implement the packet selection process discussed above, the software of the receiving node must activate the filter as soon as the client requests a given service. Typically, such a filter is activated when client software communicates a request to the receiver via a programming interface, requiring each client application to be written specifically for DVB-T receiver purposes. Further, in order to avoid software analysis of unneeded packets and therefore to optimize receiver performance, filters must be removed as soon as they are no longer needed.

It is desirable to have a method to activate and remove a filter that is independent of special programming interfaces.

| LEXICON | |
|---|---|
| DVB-T | Digital Video Broadcast - Terrestrial |
| IGMP | Internet Group Management Protocol |
| IP | Internet Protocol |
| IPv4 | Internet Protocol Version 4 |
| IPv6 | Internet Protocol Version 6 |
| MAC | Media Access Control |
| MLD | Multicast Listener Discovery |
| PID | Program identifier |
| SI | Service Information |
| SIT | Service Information table; note that this is not the table that stores the SI in the DVB standard. |
| UDP | User Datagram Protocol |

SUMMARY OF THE INVENTION

The above-identified problems are solved and a technical advance is achieved in the art by providing event driven methods for implementing or removing a filter used in receiving a multicast transmission, such as a DVB-T transmission.

An exemplary method for implementing a filter includes: detecting a message, such as an IPv6 MLD message, wherein the message comprises an address of a multicast group and a request to join the multicast group to receive a multicast transmission; in response to detecting the message, determining a filter parameter (e.g., a PID number and/or MAC address) needed to receive the multicast transmission; and implementing the filter parameter to receive the multicast transmission.

An exemplary method for removing a filter used in receiving a multicast transmission includes: detecting a message, wherein the message comprises an address of a multicast group and a request to leave the multicast group; in response to detecting the message, determining a filter parameter needed to receive the multicast transmission; and removing the filter parameter.

Alternative methods wherein filter implementation or removal is based on the detection of direct procedure calls, such as a Setsockopt call, are also disclosed. An exemplary method of using direct procedure calls for implementing a filter for use in receiving a multicast transmission includes: detecting a direct procedure call, wherein the direct procedure call comprises an address of a multicast group and a request to join the multicast group to receive a multicast transmission; in response to detecting the direct procedure call, determining a filter parameter needed to receive the multicast transmission; and implementing the filter parameter to receive the multicast transmission.

An exemplary method of using direct procedure calls for removing a filter used in receiving a multicast transmission, includes: detecting a direct procedure call, wherein the direct procedure call comprises an address of a multicast group and a request to leave the multicast group; in response to detecting the direct procedure call, determining a filter parameter needed to receive the multicast transmission; and removing the filter parameter.

Advantageously, in accordance with various embodiments of the present invention, filter changes do not require a special programming interface between a client application and a receiver of the multicast network, and thus, do not require that the client application be written specifically for multicast network receiver purposes.

Other and further aspects of the present invention will become apparent during the course of the following description and by referring to the attached drawings.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1A:
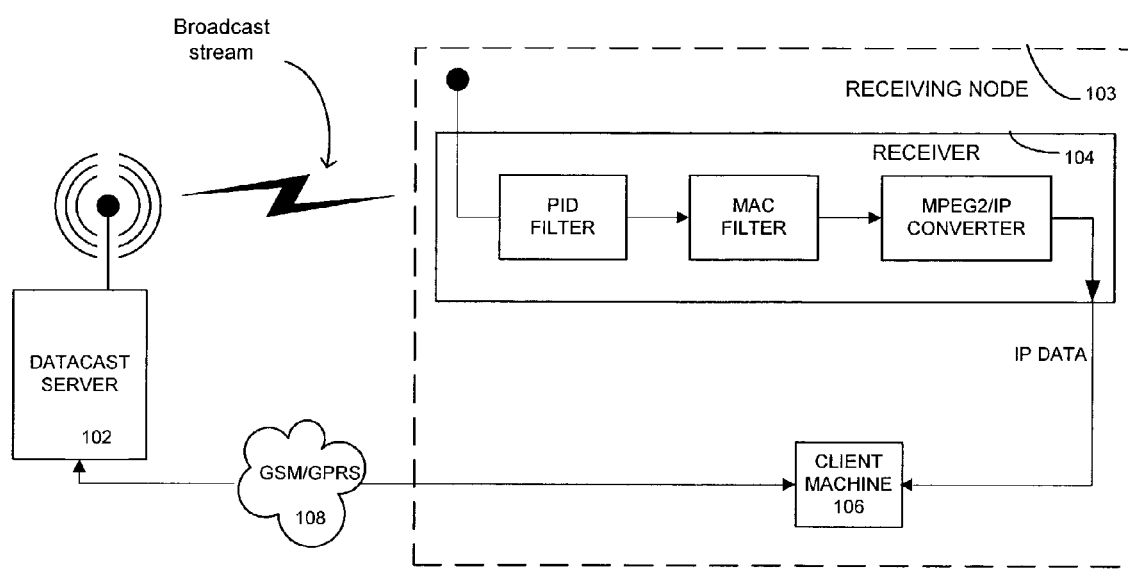
FIG. 1A is a block diagram of an exemplary network wherein the present invention may be utilized.

FIG. 1A depicts a basic multicast network having at least a transmitting terminal 102 such as a Datacast Server and a receiving node 103. In this embodiment, the receiving node includes a DVB-T Receiver 104 and a client machine 106. The client machine 106 may be a personal computer, a set-top box, a handheld wireless device, such as a mobile phone, or the like with a display for viewing the data being broadcast. Moreover, it is to be understood that in this type of network a plurality of receiving nodes typically are present. Multiple receiving nodes, however, are omitted from FIG. 1A for simplicity. The client machine 106 is also coupled to the transmitting terminal 102 via a bi-directional network, such as a GSM or GPRS network, for use in, e.g., transmitting service requests to transmitting terminal 102.

In a multicast network of the type shown in FIG. 1A, the transmitting terminal 102 divides each program into packets allowing a plurality of programs to be placed onto a common data channel. The transmitting terminal transmits a plurality of packets in the form of a Packetized Element Stream in which each packet includes filter parameters in the form of a Program Identifier (PID) and a DVB-Media Access Control (MAC) address. The receiver 104 at the receiving node 103 identifies desired packets from a plurality of data packets on the multicast channel using filter parameters. In particular, packet identification is a two step process taking place at the receiver, where the first step is a rudimentary hardware selection and the second step is a positive identification in software.

Figure 1B:
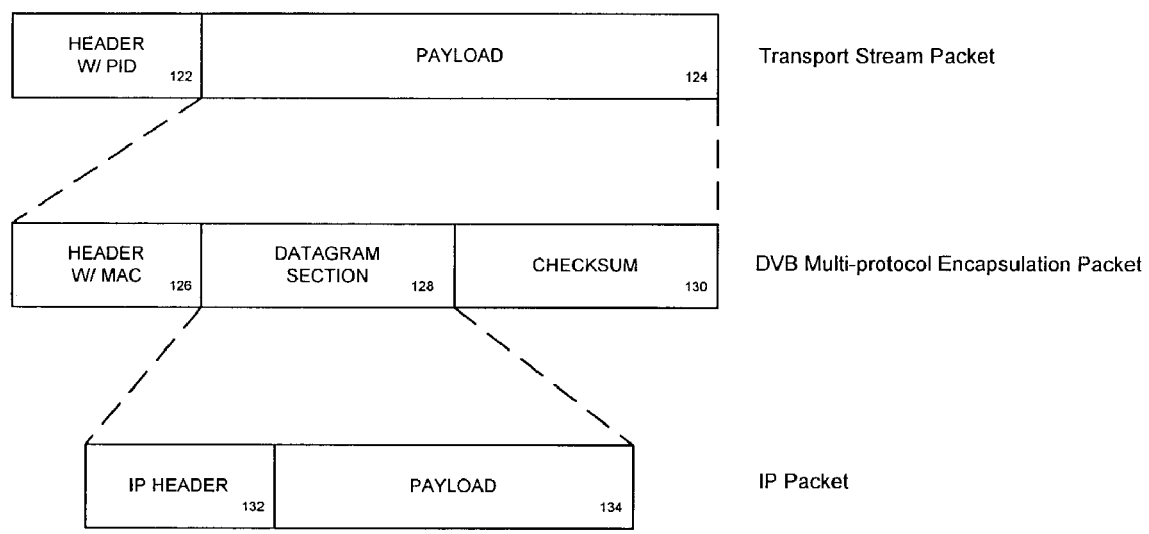
FIG. 1B is a block diagram depicting the changes that take place to the packet at the DVB receiver in one embodiment of the present invention.

FIG. 1B depicts the relationship between the packets utilized by the transport stream, the multi-protocol DVB encapsulation packets, and the IP packets sent by the receiver to the client machine. The transport stream packet is a 188 byte packet containing a header of 4 bytes 122 and payload of 184 bytes 124; these are the packets sent by the DVB-T transmitter. When this packet is received, the receiver examines this transport stream packet using hardware, and selects each packet in the stream whose PID matches the criteria the filter has identified. The receiver then strips the transport stream information off the packet, typically in software, to access the DVB multi-protocol encapsulation packet. This packet contains a header that conveys a unique MAC address 126, a datagram section containing data 128, and a checksum section for error correcting purposes 130. The receiver examines the MAC address, and accepts all packets that are part of the desired program.

Using a two-stage filter of the type described minimizes load on the protocol stack of the receiver and the client, as hardware can quickly examine the PID. By this hardware analysis, a significant portion of unwanted packets are removed without entry into the protocol stack. Other methods of packet selection by receiving nodes are known in the art.

Once the receiver determines the DVB packet to be part of the desired program, the DVB encapsulation is stripped off to produce an IP packet. The IP packet is composed of a header 132 and a payload 134, and can be readily accepted by the client machine. The relationship between the three packets is depicted as descending from transport stream packet to IP in FIG. 1B.

Further, an alternate embodiment includes attaching a DVB-T receiver to a portable terminal, such as a personal digital assistant by means of a USB cable, or using a PCM-CIA type DVB receiver in conjunction with a client PC. In yet an alternate embodiment, the DVB-T receiver is fully integrated within a mobile terminal, such as a mobile telephone, by coupling the DVB receiver through an internal bus to the telephone's CPU.

In still another embodiment, a system of this type may be software that, when executed on a client PC having an interface to a DVB-T receiver, will automatically direct the receiver to subscribe to a given service.

Figure 2:
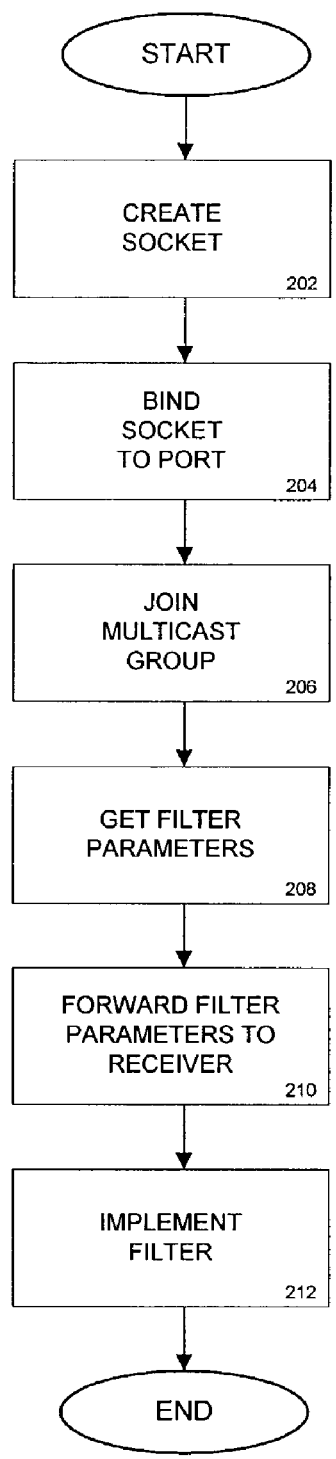
FIG. 2 is a block diagram exemplary of the process required for a receiving terminal to join a multicast group.

FIG. 2 demonstrates the process by which a receiving node requests access to a multicast stream and begins capturing information from that stream in accordance with one embodiment of the present invention. In step 202, the client machine opens a multicast IP socket for data retrieval when an application on the client machine requests multicast data. In step 204, the receiver binds this socket to a port number. At this point in the process, an entry to the UDP Listener Table is created.

The UDP Listener Table is a table that tracks each data connection the client machine currently has open. This table is populated with entries having information that allow a system to track incoming packet streams.

In one embodiment of the present invention, a service information table (SIT) tracks a variety of information for use in multicast data retrieval. In particular, the SIT tracks UDP port numbers, filter parameters for identifying incoming packets, and filter status indicating whether a filter is currently enabled. The information in this table is updated as needed, both from internal receiver state changes e.g., filter activation, and from service information carried by the network e.g., new available services.

In step 206, the receiving node joins a multicast group, typically by transmitting a 'membership request' IGMP packet to upstream switching nodes. In step 208, filter parameters are retrieved from the SIT table, and forwarded, in step 210, to the receiver. In step 212, the receiver implements the filter using the filter parameters.

Figure 3:
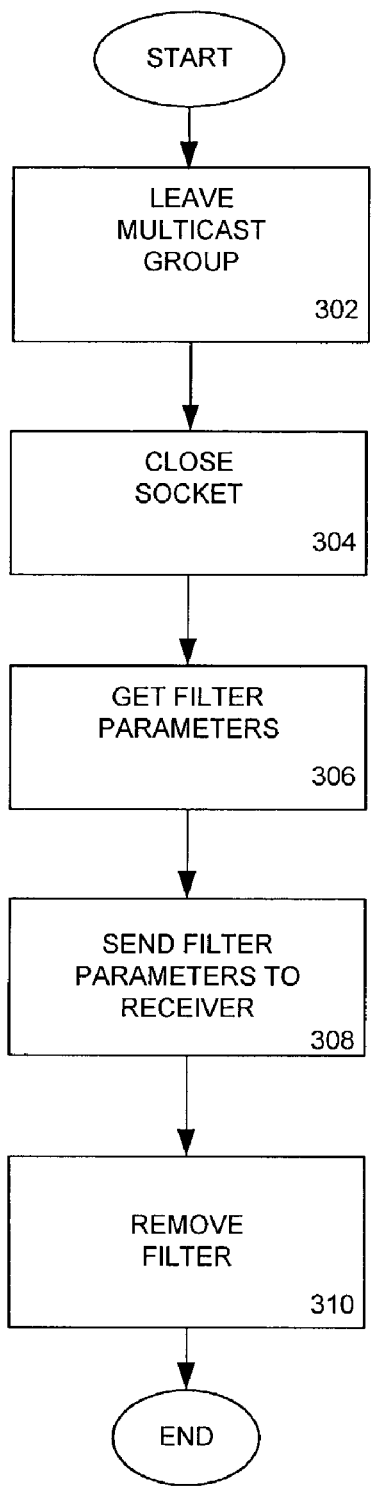
FIG. 3 is a block diagram exemplary of the process required for a receiving terminal to leave a multicast group.

FIG. 3 demonstrates the process by which a receiving node ends its membership in a multicast group. In step 302, the client machine leaves the multicast group when the application accessing the data determines that the multicast connection is no longer needed. This is done, typically, by sending an IGMP 'leave' message to upstream switching nodes. In step 304, the client machine closes the socket and deletes the entry from the UDP listener table, thereby ending the connection between the client software and the multicast data stream. In step 306, filter parameters are again retrieved from the SIT. These parameters are forwarded to the receiver in step 308, which, in step 310, removes the filter.

Figure 4:
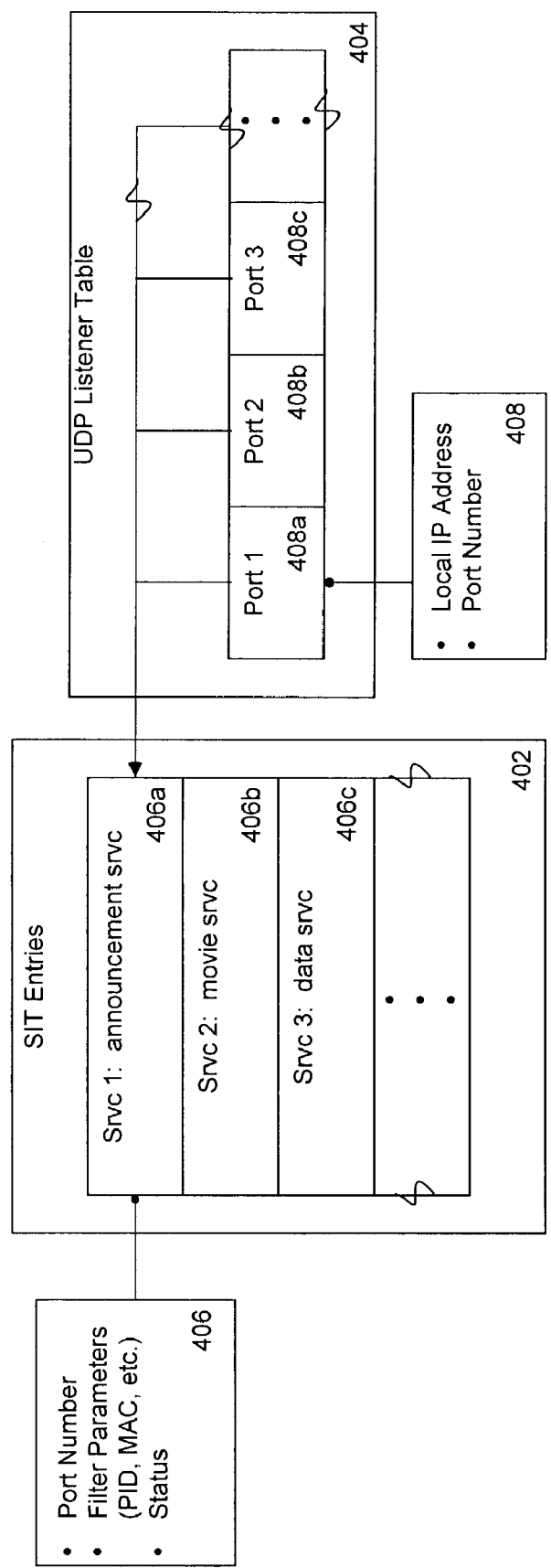
FIG. 4 is a block diagram exemplary of the relationship between the UDP Listener Table and the SIT.

FIG. 4 shows the relationship between a SIT and a UDP Listener Table for use by the receiving node in accordance with one embodiment of the present invention.

The UDP Listener Table maintained by the client machine is typically used as an index of all incoming UDP signals and the local IP addresses the client machine has assigned to the signals. In accordance with one embodiment of the present invention, the relationship between the SIT and the UDP Listener Table is exploited to allow filters to be activated and removed without any special programming interface, as will be discussed.

Referring to FIG. 4, the SIT 402 contains a number of entries 406a, 406b, 406c, each corresponding to a data stream. Each entry 406 includes a port number, filter parameters of a multicast data stream, and the state, active or inactive, of any filter that is associated with that stream. The port numbers are typically 32 bits in length, the filter parameters include, but are not limited to, the PID and MAC. It will be understood by those skilled in the art that, although not shown in FIG. 4, the SIT may contain other data.

The UDP Listener Table 404 contains a number of entries 408a, 408b, 408c, each entry corresponding to a port that is currently active in the machine. Each entry 408 includes a local IP Address and a UDP port number. It will be understood by those skilled in the art that the UDP listener table may include other information.

Entries associated with multicast data in the UDP Listener Table are identified with a 0.0.0.0 value as their local IP address. As such, it is easy to identify all currently open multicast streams to which the receiver is connected by extracting all entries with this value from the UDP Listener Table. Multicast ports in the UDP Table can then be compared to multicast entries in the SIT, thereby allowing the receiver to determine the state of all multicast connections and identify whether to enable, remove, or ignore filters.

Figure 5:
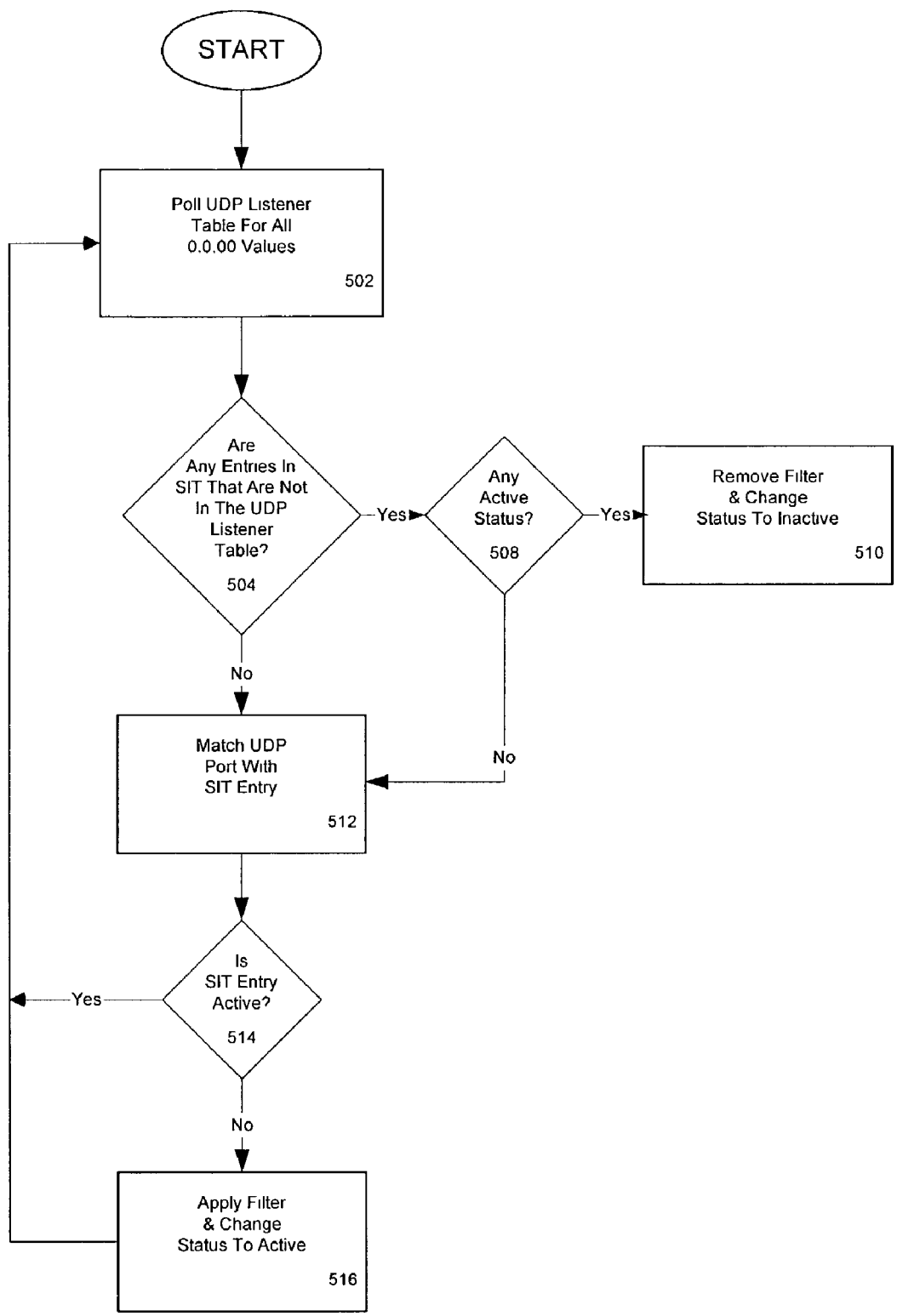
FIG. 5 is a process flow diagram depicting an exemplary embodiment of the invention using UDP Listener Table polling.

FIG. 5 is a flow chart illustrating an exemplary method by which a receiving node manages filters in accordance with one embodiment of the present invention.

In step 502, the UDP Listener Table is polled for a list of all entries that have 0.0.0.0 as their local IP address. Since polling of the UDP Listener Table is continuous, updates to filter status do not require any specialized trigger. In an alternate embodiment, the continuous examination of the UDP Listener Table is replaced by passively detecting the entry or removal to the UDP Listener Table of any local IP address that has a multicast local IP address value.

In step 504, the SIT is examined for entries that do not correspond to entries in the UDP list compiled in step 502. If there are entries in the SIT that do not correspond to those in the UDP list, in step 508, these SIT entries are examined to determine whether they have an 'active' status. SIT entries that are not in the UDP list but which have an active status are connections that have been closed and which are consequently no longer needed. In step 510, filters corresponding to those entries are removed and their status are reset to 'inactive.' This process, steps 504-510, is then repeated until it has been determined that all SI entries either correspond to a UDP entry or are 'inactive.'

At that point, in step 512, all SI entries that match entries in the UDP list are scrutinized. In particular, in step 514, the status of the SI entries is examined. If the entry is 'inactive,' then a filter is applied in step 516, and the status is set to 'active.' If there are no inactive entries in the SI list corresponding to the UDP list, control is returned to step 502 and the filter management process is repeated. The above-described steps ensure that filters are removed quickly after the multicast connection is closed by the client, thereby minimizing unnecessary load on the system.

Sequencing in the present invention is not crucial to operation, and consequently the steps disclosed in FIG. 5 can be reordered. For example, UDP entries that match SI entries may be disposed of first (steps 512-516), with the removal step (step 510) located at the end of an iteration. Further, several of these steps may be processed in parallel, such that the removal step 510 occurs simultaneously with the filter application step (step 516). Moreover, a list of entries to be examined need not be generated, but rather the SI or UDP entries may be processed one entry at a time.

Figure 6:
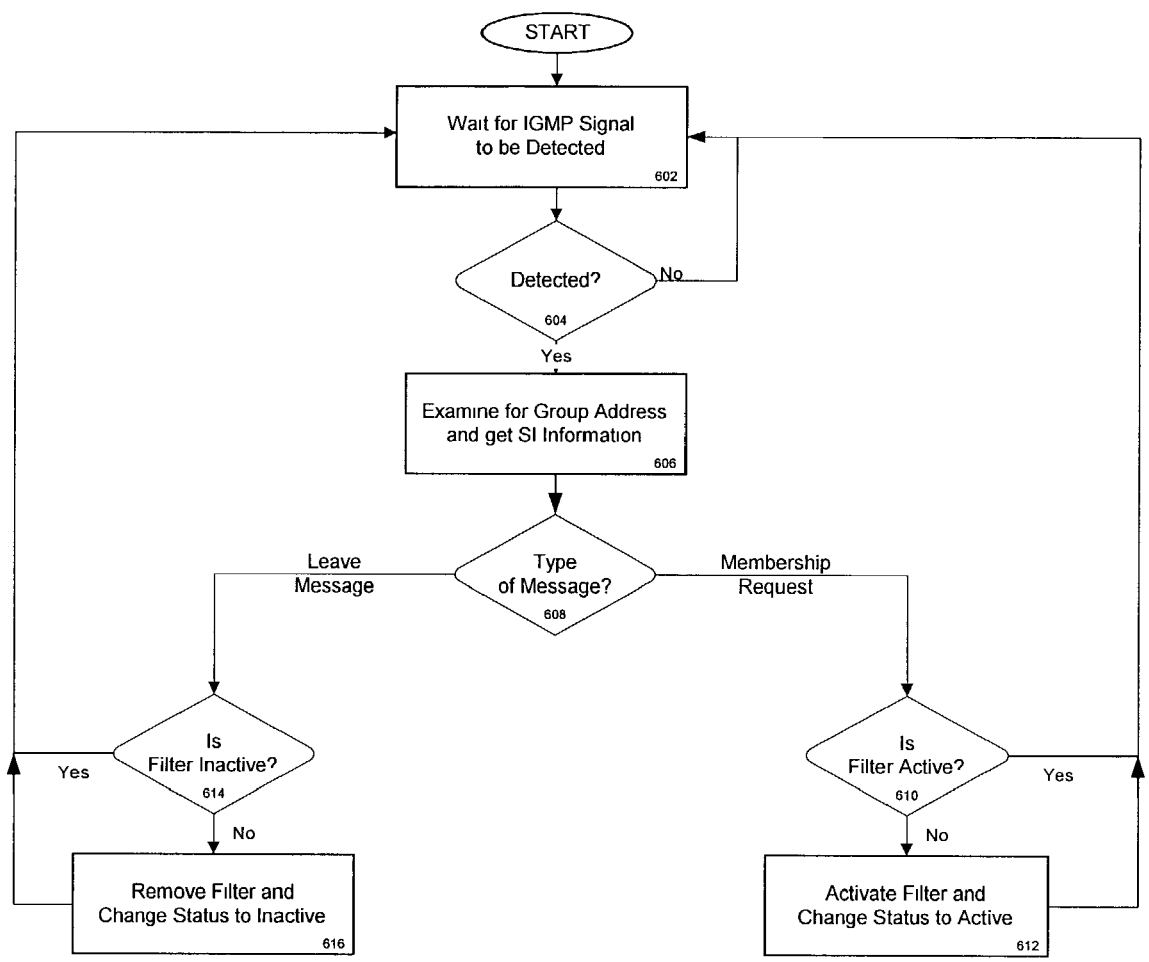
FIG. 6 is a process flow diagram depicting an exemplary embodiment of the invention using IGMP event detection.

FIG. 6 is a flow chart illustrating an exemplary method wherein IGMP messages originating at a receiving node are used to determine if a filter needs to be added or removed. IGMP packets are network signals that provide information to switching nodes about receiving nodes to which they are attached. This type of signal is used to minimize load on the network, ensuring that a data stream is only repeated if a listener attached to the node will subscribe to it. By detecting IGMP signals transmitted by the receiving node, this method requires no repetitive polling, only passive monitoring, which accomplishes filter initiation independently of any special programming interfaces.

Referring to FIG. 6, in steps 602 and 604 the system detects receipt of an IGMP message. If an IGMP signal is detected then, in step 606, the client machine examines it to determine the entry in the SIT to which the IGMP message corresponds. In step 608, the client machine determines whether the IGMP message is a request to join a multicast group or a request to leave a multicast group.

If it is determined in step 608 that the IGMP signal is a request to join a group then, step 610, the filter state is examined. 'Active' filters are ignored, causing the client machine to again monitor IGMP traffic in step 602. If the filter state in step 610 is 'inactive,' in step 612 a filter is activated based on the filter parameters and the entry in the SIT is updated to reflect the new 'active' status. With the filter activated, scanning resumes in step 602.

If the IGMP message in step 608 is a request to leave the multicast group, then in step 614 the status of the SI entry to which the message corresponds is determined. In the status of the entry is 'inactive,' it is ignored since there is no filter to remove, and detection in step 602 resumes. If the status of the entry is 'active', then, in step 616, the filter is removed and the status of the entry is changed to 'inactive.' With the filter removed, scanning resumes in step 602.

This embodiment relies on passive detection of signals, and thus its impact on system performance is minimal.

Figure 7:
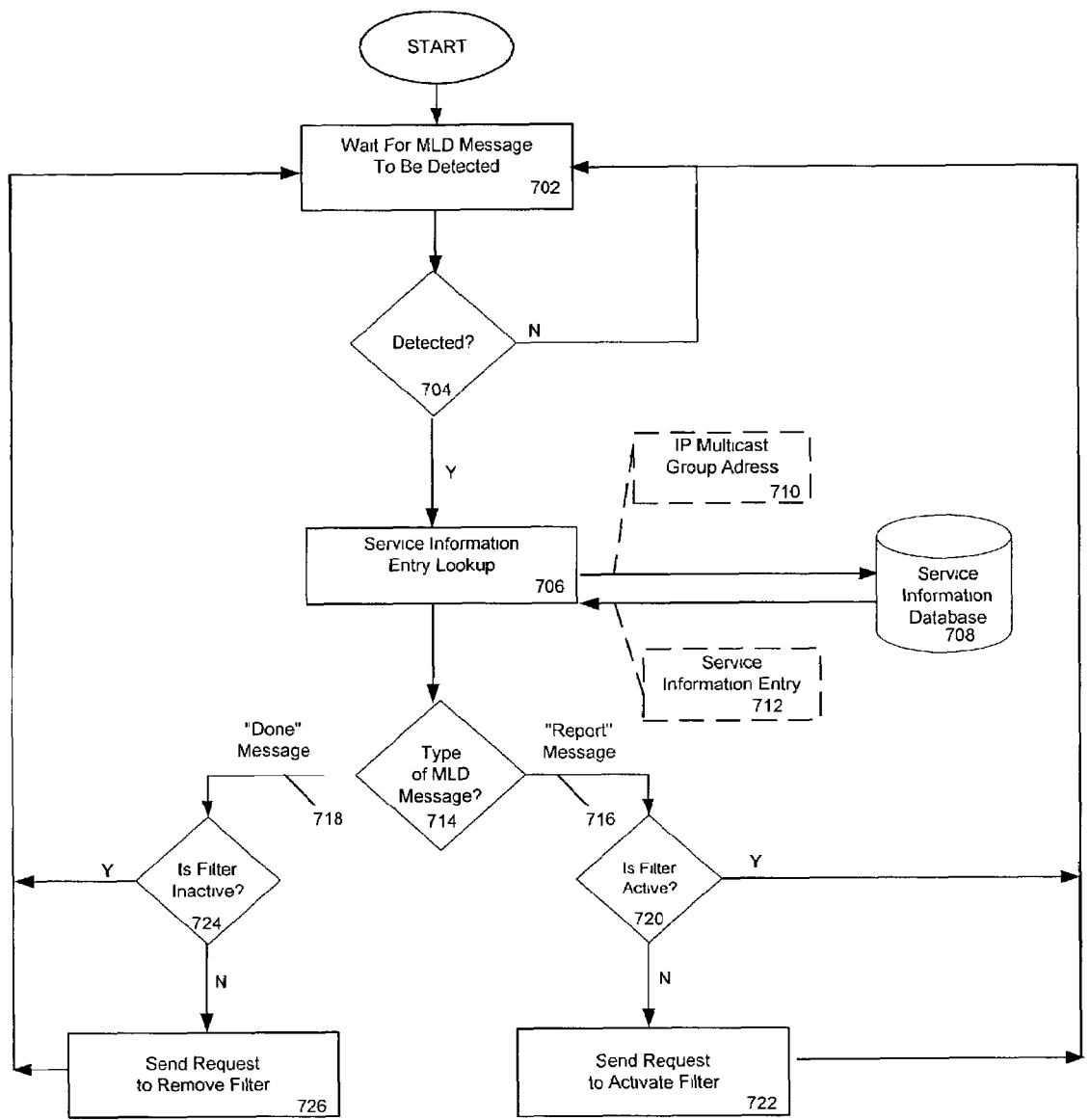
FIG. 7 is a process flow diagram illustrating an exemplary embodiment using Multicast Listener Discovery (MLD) message detection to effect filter creation/removal.

FIG. 7 is a process flow diagram illustrating an exemplary embodiment using Multicast Listener Discovery (MLD) message detection to effect filter creation/removal.

In general, MLD messages are used by an IPv6 switching node (e.g., a router) to discover the presence of multicast listeners (i.e., receiving nodes) on its directly attached links. When a client application, such as an audio or video player, wishes to receive a multicast transmission (e.g., data streams or files), it creates a socket, binds the socket to a port on the client machine and then joins a multicast group corresponding to the multicast transmission of interest. A multicast group is the transmit channel for the broadcasted data. The application joins the multicast group by transmitting an MLD Report Message, as will be discussed in detail hereinafter, to the Datacast Server 102 via network 108. To receive the transmission, a filter (including parameters such as a PID number and MAC address) is needed to filter from the transport stream the IP packets that correspond to the multicast transmission of interest. In contrast, when a client application wishes to cease receiving a multicast transmission, it leaves the multicast group by transmitting an MLD Done Message, as will also be discussed in detail hereinafter, and closes the socket. In accordance with the embodiment of the invention illustrated in FIG. 7, as will further be discussed in detail hereinafter, client machine 102 detects MLD messages originating from a client application and uses them to determine whether a filter needs to be added to receiver 104 to receive a multicast transmission or removed from receiver 104 because the client application has ceased receiving the multicast transmission.

Turning to FIG. 7, in steps 702 and 704, client machine 106 waits for the detection of an MLD message generated by a client application. A network interface device driver of client machine 106 identifies MLD messages in IPv6 packets by a preceding Next Header value of 58. An MLD message includes, among other things, a field for the "type" of the MLD message. For purposes of the present invention, the message types of interest are the above-mentioned Report message and Done message. Report and Done messages are identified by either a decimal 131 or 132, respectively, in the type field. Report and Done messages also include a field containing a specific IPv6 multicast group address to which the client application wants to listen or has ceased to listen, respectively.

If, in step 704, an MLD message is detected, then in step 706, the client machine performs a service information entry lookup in service information database 708. Database 708 includes entries for each available service being transmitted by Datacast server 102. Each entry preferably includes a multicast IP address, a port number, filter parameters (e.g., a PID number and a MAC address) and a filter status indicator. The information in database 708 is populated and updated as needed by the receiver 104 (e.g., with a port number assigned by the client application or machine 106 and filter status changes for each entry) and Datacast server 102 (e.g., with new entries for newly available services). Although preferably resident on client machine 106, database 708 may instead be remotely located in a network such as, e.g., network 108.

Returning to step 706, the service information entry lookup involves the client machine 106 transmitting the multicast group address 710 to service information database 708, which, in turn, returns a service information entry 712 having a multicast group address that matches the transmitted address 710. In addition to the matching multicast IP address, the service information entry 712 will include a port number, filter parameters and a filter status indicator. In step 714, client machine 106 determines the MLD message type or, more specifically, whether the MLD message detected in step 704 is a Report message 716 or a Done message 718.

If the MLD message is a Report message 716 then, in step 720, client machine 106 determines, from the filter status indicator in the returned service information entry 712, whether the filter is active. If it is active, then client machine 106 simply need not take any action and instead returns to step 702 to wait for the detection of further MLD messages. If, however, it is determined in step 720 that the filter is inactive then, in step 722, client machine 106 sends a request to receiver 104 to activate the filter using the relevant filter parameters. The request may include the multicast IP address (or another identifier) that receiver 104 can use to obtain the filter parameters either from data base 708 or from other service information tables that may have been received in a Datacast server 102 broadcast (e.g., DVB-T) and stored in receiver 104. Alternatively, the request may include the filter parameters themselves. Thereafter, client machine 106 returns to step 702 to wait for further MLD messages.

If it is determined in step 714 that the MLD message is a Done message, client machine 106 determines from the filter status indicator received from database 708 whether the filter is inactive. If the filter is inactive, client machine 106 need not take any action. Instead, client machine 106 returns to step 702 to await detection of further MLD messages. If, however, the filter is active then, in step 726, client machine 106 sends a request to receiver 104 to remove the filter and returns to step 702 to continue monitoring for further MLD messages.

Figure 8:
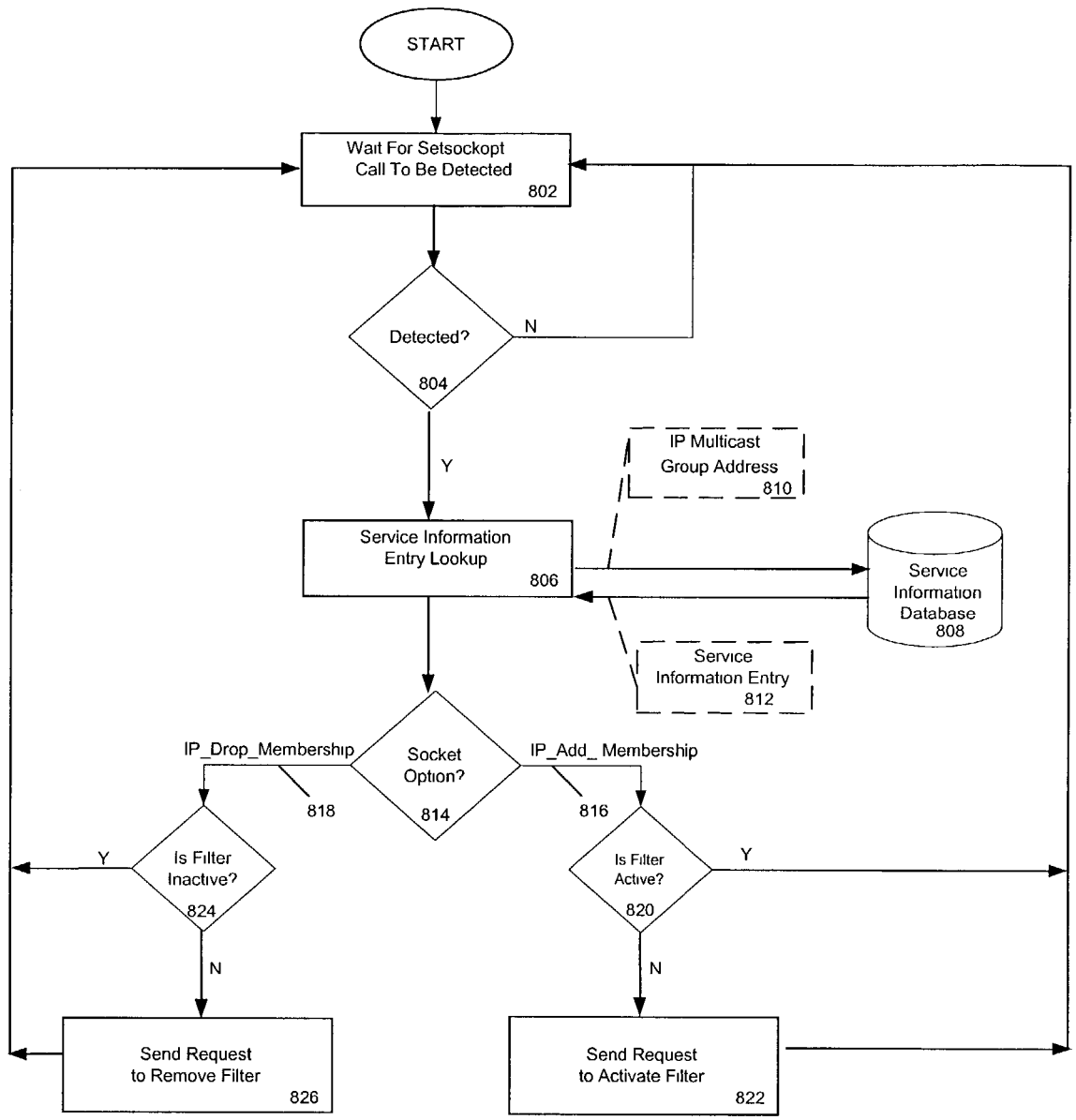
FIG. 8 is a process flow diagram illustrating an exemplary embodiment using direct procedure call detection to effect filter creation/removal.

FIG. 8 is a process flow diagram illustrating an exemplary embodiment using direct procedure call detection to effect filter creation/removal.

Briefly, in this embodiment, a client application wishing to join an IP multicast group creates a socket, binds the socket to a port number on the client machine and then uses a direct procedure call, such as a "Setsockopt" call, as will be discussed in detail hereinafter, to become a member of the IP multicast group. A client application wishing to end an IP multicast data reception uses a Setsockopt call to drop its membership in the IP multicast group, as will also be discussed in detail hereinafter. The client application sends Setsockopt calls from the client machine 106 to the DataCast Server 102 via network 108.

A direct procedure call, such as a Setsockopt call, is a function call in the socket application programming interface ("API") provided by the TCP/IP stack, as is well known in the art. The setsockopt call, in particular, allows a programmer to manipulate options associated with a socket; it is defined in the socket API and is standardized in Ipv6. It is a de facto standard in Ipv4. In accordance with the embodiment illustrated in FIG. 8, as will further be discussed in detail hereinafter, client machine 106 detects Setsockopt calls that have originated from the client application and uses these calls to determine whether a filter needs to be implemented in receiver 104 to receive a multicast transmission or removed from receiver 104 upon ceasing to receive the multicast transmission.

Turning to FIG. 8, in steps 802 and 804, client machine 106 waits for the detection of a Setsockopt call generated by a client application. In particular, the IP stack will deliver the information in the Setsockopt call to a network interface device driver of client machine 106, which then generates a filter request. A Setsockopt call will contain different information depending upon whether the call is being sent to join an IP multicast group or to leave an IP multicast group. If sent to join an IP multicast group, the Setsockopt call will contain a socket identifier (e.g., for binding to a port number), a parameter for joining the IP multicast group (e.g., IP_ADD_MEMBERSHIP) and an IPv6 multicast group address corresponding to the IP multicast group that the client application wishes to join. In contrast, if the Setsockopt call is sent for purposes of leaving an IP multicast group, the call will contain a socket identifier, a parameter for leaving the IP multicast group (e.g., IP_DROP_MEMBERSHIP) and an IPv6 multicast group address corresponding to the IP multicast group that the client application wishes to leave.

If, in step 804, a Setsockopt call is detected, then in step 806, the client machine 106 conducts a service information entry lookup in service information database 808. As discussed above in connection with FIG. 7, database 808 includes entries for each available service, and each entry includes a multicast IP address, a port number, filter parameters and a filter status indicator. Database 808, although preferably resident on client machine 106, may instead reside within a network such as network 108. The database lookup performed in step 806 involves the client machine 106 transmitting the multicast group address 810 to service information database 808. The database 808 will respond with an entry 812 containing a multicast group address that matches the transmitted address 810. In addition to the matching multicast IP address, the returned entry 812 will include a port number, filter parameters and a filter status indicator.

In step 814, client machine 106 determines whether the Setsockopt call includes a parameter for joining the IP multicast group (e.g., IP_ADD_MEMBERSHIP) or a parameter for leaving the IP multicast group (e.g., IP_DROP_MEMBERSHIP). If the Setsockopt call includes an IP_ADD_MEMBERSHIP parameter then, in step 820, client machine 106 determines, from the filter status indicator in the returned service information entry 812, whether the filter is active. If it is active, then client machine 106 need not take any action and simply returns to step 802 to wait for the detection of further Setsockopt calls. However, if it is determined in step 820 that the filter is inactive then, in step 822, client machine 106 sends a request to receiver 104 to activate the filter using the filter parameters included in the service information entry 812 that was returned in response to the data base lookup that occurred in step 806. The request may include the multicast IP address that receiver 104 can use to obtain the filter parameters from data base 808 or from other service information tables stored in receiver device 104. Alternatively, the request may include the actual filter parameters themselves. Thereafter, client machine 106 returns to step 802 to await detection of other Setsockopt calls.

If it is determined in step 814 that the Setsockopt call includes an IP_DROP_MEMBERSHIP parameter, client machine 106 determines whether the filter is inactive. If the filter is inactive, client machine 106 needs not modify any filters in receiver 104 and returns to step 802 to await detection of further Setsockopt calls. If, however, the filter is active then, in step 826, client machine 106 sends a request to receiver 104 to remove the filter and thereafter returns to step 802 to await detection of further Setsockopt calls.

As is evident from the foregoing, in accordance with various embodiments of the present invention, filter changes advantageously do not require a special programming interface between the client application and the receiver 104, and thus, do not require that the client application be written specifically for multicast receiver purposes. Moreover, an efficient mechanism is provided for ensuring that filters are created only when needed and removed when the client application leaves the multicast group. Like the embodiment of FIG. 6, the embodiments of FIGS. 7 and 8 rely on the passive detection of signals (albeit in an IPv6 environment, rather than an IPv4 environment), and thus, the impact on system performance is minimal.

It also will be appreciated that the above-illustrated processes, or portions thereof, may be practiced by devices other than the client machine 106. For example, client machine 106 may transmit MLD messages or direct procedure calls received from a client application to receiver 104, which, in turn, uses this information in practicing, e.g., the processes of FIGS. 7 and 8.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

What is claimed is:

1. A method, comprising:
    detecting a message for transmission to a multicast server, wherein the message comprises an address of a multicast group and a request to join the multicast group to receive a multicast transmission;
    in response to detecting the message, determining and retrieving, from a service information table in a receiving node, a filter parameter needed to receive the multicast transmission, the service information table including filter parameters and filter status information indicating whether a filter is currently enabled; and
    implementing a filter according to the retrieved filter parameter.

2. The method of claim 1 wherein the message is a Multicast Listener Device (MLD) message.

3. The method of claim 2 wherein the MLD message is a Report message.

4. The method of claim 1 wherein the message is detected by a Next Header value of 58 in an immediately preceding header.

5. The method of claim 1 wherein the message is generated by a client application.

6. The method of claim 1 wherein the request to join a multicast group comprises information in a type field of the message.

7. The method of claim 6 wherein the information is a decimal 131.

8. The method of claim 1 wherein determining a filter parameter needed to receive the multicast transmission includes querying a storage device for a filter parameter needed to receive the multicast transmission.

9. The method of claim 8 wherein the storage device is a service information data base.

10. The method of claim 1 wherein implementing the filter parameter includes sending a request to a receiver to implement the filter parameter.

11. The method of claim 10 wherein the receiver is a digital video broadcasting-terrestrial (DVB-T) receiver.

12. The method of claim 10 wherein sending a request to the receiver to implement the filter parameter includes sending the filter parameter.

13. The method of claim 1 wherein the method is implemented in a wireless hand-held terminal.

14. The method of claim 1 wherein the filter parameter comprises a program identifier (PID) number and a media access control (MAC) address.

15. A method, comprising:
  detecting a message for transmission to a multicast server, wherein the message comprises an address of a multicast group and a request to leave the multicast group;
  in response to detecting the message, determining and retrieving, from a service information table in a receiving node, a filter parameter needed to receive the multicast transmission, the service information table including filter parameters and filter status information indicating whether a filter is currently enabled; and
  removing a filter according to the retrieved filter parameter.

16. The method of claim 15 wherein the message is a Multicast Listener Device (MLD) message.

17. The method of claim 16 wherein the MLD message is a Done message.

18. The method of claim 15 wherein the message is detected by a Next Header value of 58 in an immediately preceding header.

19. The method of claim 16 wherein the MLD message is generated by a client application.

20. The method of claim 15 wherein the request to leave a multicast group comprises information in a message type field.

21. The method of claim 20 wherein the information is a decimal 132.

22. The method of claim 15 wherein determining a filter parameter needed to receive the multicast transmission includes querying a storage device for a filter parameter needed to receive the multicast transmission.

23. The method of claim 22 wherein the storage device is a service information data base.

24. The method of claim 15 wherein removing the filter parameter comprises sending a request to a receiver to remove the filter parameter.

25. The method of claim 24 wherein sending a request to a receiver to remove the filter parameter includes sending the filter parameter.

26. The method of claim 24 wherein the receiver is a digital video broadcasting-terrestrial (DVB-T) receiver.

27. The method of claim 15 wherein the method is implemented in a wireless hand-held terminal.

28. The method of claim 15 wherein the filter parameter comprises a program identifier (PID) number and a media access control (MAC) address.

29. A method, comprising:
  detecting a direct procedure call for transmission to a multicast server, wherein the direct procedure call comprises an address of a multicast group and a request to join the multicast group to receive a multicast transmission;
  in response to detecting the direct procedure call, determining and retrieving, from a service information table in a receiving node, a filter parameter needed to receive the multicast transmission, the service information table including filter parameters and filter status information indicating whether a filter is currently enabled; and
  implementing a filter according to the retrieved filter parameter.

30. The method of claim 29 wherein the direct procedure call is a setsockopt call.

31. The method of claim 29 wherein the direct procedure call is generated by a client application.

32. The method of claim 29 wherein determining a filter parameter needed to receive the multicast transmission includes querying a storage device for a filter parameter needed to receive the multicast transmission.

33. The method of claim 32 wherein the storage device is a service information data base.

34. The method of claim 29 wherein implementing the filter parameter comprises sending a request to a receiver to implement the filter parameter.

35. The method of claim 34 wherein the receiver is a digital video broadcasting-terrestrial (DVB-T) receiver.

36. The method of claim 34 wherein sending a request to the receiver to implement the filter parameter includes sending the filter parameter.

37. The method of claim 29 wherein the method is implemented in a wireless hand-held terminal.

38. The method of claim 29 wherein the filter parameter comprises a program identifier (PID) number and a media access control (MAC) address.

39. A method, comprising:
  detecting a direct procedure call for transmission to a multicast server, wherein the direct procedure call comprises an address of a multicast group and a request to leave the multicast group;
  in response to detecting the direct procedure call, determining and retrieving, from a service information table in a receiving node, a filter parameter needed to receive the multicast transmission, the service information table including filter parameters and filter status information indicating whether a filter is currently enabled; and
  removing a filter according to the retrieved filter parameter.

40. The method of claim 39 wherein the direct procedure call is a setsockopt call.

41. The method of claim 39 wherein the direct procedure call is generated by a client application.

42. The method of claim 39 wherein determining a filter parameter needed to receive the multicast transmission includes querying a storage device for a filter parameter needed to receive the multicast transmission.

43. The method of claim 42 wherein the storage device is a service information data base.

44. The method of claim 39 wherein removing the filter parameter comprises sending a request to a receiver to remove the filter parameter.

45. The method of claim 44 wherein the receiver is a digital video broadcasting-terrestrial (DVB-T) receiver.

46. The method of claim 44 wherein the request to the receiver to remove the filter parameter includes the filter parameter.

47. The method of claim 39 wherein the method is implemented in a wireless hand-held terminal.

48. The method of claim 39 wherein the filter parameter comprises a program identifier (PID) number and a media access control (MAC) address.

49. An apparatus, comprising:
  a memory device for storing a program; and a processor in communication with the memory device, the processor configured for use with the program to:
detect a message for transmission to a multicast server, wherein the message comprises an address of a multicast group and a request to join the multicast group to receive a multicast transmission;
in response to detection of the message, determine and retrieve, from a service information table in a receiving node, a filter parameter needed to receive the multicast transmission, the service information table including filter parameters and filter status information indicating whether a filter is currently enabled; and
implement a filter according to the retrieved filter parameter.

50. The apparatus of claim 49 wherein the terminal is a wireless hand-held terminal.

51. The apparatus of claim 49 wherein the message is a Multicast Listener Device (MLD) message.

52. The apparatus of claim 51 wherein the MLD message is a Report message.

53. The apparatus of claim 49 wherein implementing the filter parameter includes sending a request to a receiver to implement the filter parameter.

54. The apparatus of claim 53 wherein the receiver is a digital video broadcasting-terrestrial (DVB-T) receiver.

55. The apparatus of claim 49 wherein the filter parameter comprises a program identifier (PID) number and a media access control (MAC) address.

56. An apparatus comprising, comprising:
a memory device for storing a program; and
a processor in communication with the memory device, the processor configured for use with the program to:
detect a message for transmission to a multicast server, wherein the message comprises an address of a multicast group and a request to leave the multicast group;
in response to detection of the message, determine and retrieve, from a service information table in a receiving node, a filter parameter needed to receive the multicast transmission, the service information table including filter parameters and filter status information indicating whether a filter is currently enabled; and
remove a filter according to the retrieved filter parameter.

57. The apparatus of claim 56 wherein the terminal is a wireless hand-held terminal.

58. The apparatus of claim 56 wherein the message is a Multicast Listener Device (MLD) message.

59. The apparatus of claim 58 wherein the MLD message is a Done message.

60. The apparatus of claim 56 wherein removing the filter parameter comprises sending a request to a receiver to remove the filter parameter.

61. The apparatus of claim 60 wherein sending a request to a receiver to remove the filter parameter includes sending the filter parameter.

62. The apparatus of claim 61 wherein the receiver is a digital video broadcasting-terrestrial (DVB-T) receiver.

63. The apparatus of claim 56 wherein the filter parameter comprises a program identifier (PID) number and a media access control (MAC) address.

64. An apparatus, comprising:
a memory device for storing a program; and
a processor in communication with the memory device, the processor configured for use with the program to:
detect a direct procedure call for transmission to a multicast server, wherein the direct procedure call comprises an address of a multicast group and a request to join the multicast group to receive a multicast transmission;
in response to detecting the direct procedure call, determine and retrieve, from a service information table in a receiving node, a filter parameter needed to receive the multicast transmission, the service information table including filter parameters and filter status information indicating whether a filter is currently enabled; and
implement a filter according to the retrieved filter parameter.

65. The apparatus of claim 64 wherein the terminal is a wireless hand-held terminal.

66. The apparatus of claim 64 wherein the direct procedure call is a setsockopt call.

67. The apparatus of claim 64 wherein implementing the filter parameter comprises sending a request to a receiver to implement the filter parameter.

68. The apparatus of claim 67 wherein the receiver is a digital video broadcasting-terrestrial (DVB-T) receiver.

69. The apparatus of claim 64 wherein the filter parameter comprises a program identifier (PID) number and a media access control (MAC) address.

70. An apparatus, comprising:
a memory device for storing a program; and
a processor in communication with the memory device, the processor configured for use with the program to:
detect a direct procedure call for transmission to a multicast server, wherein the direct procedure call comprises an address of a multicast group and a request to leave the multicast group;
in response to detecting the direct procedure call, determine and retrieve, from a service information table in a receiving node, a filter parameter needed to receive the multicast transmission, the service information table including filter parameters and filter status information indicating whether a filter is currently enabled; and
remove a filter according to the retrieved filter parameter.

71. The apparatus of claim 70 wherein the terminal is a wireless hand-held terminal.

72. The apparatus of claim 70 wherein the direct procedure call is a setsockopt call.

73. The apparatus of claim 70 wherein removing the filter parameter comprises sending a request to a receiver to remove the filter parameter.

74. The apparatus of claim 73 wherein the receiver is a digital video broadcasting-terrestrial (DVB-T) receiver.

75. The apparatus of claim 70 wherein the filter parameter comprises a program identifier (PID) number and a media access control (MAC) address.

76. A method, comprising:
detecting, by a client machine, a first communication generated by a client application for transmission to a server over a network, wherein the first communication comprises an address of a multicast group and one of either a request to join the multicast group to receive a multicast transmission or a request to leave the multicast group to no longer receive the multicast transmission;
in response to detecting the first communication, determining and retrieving, from a service information table in the client machine, a filter parameter needed to receive the multicast transmission, the service information table including filter parameters and filter status information indicating whether a filter is currently enabled; and
sending a second communication from the client machine to a multicast receiver to, according to the retrieved filter parameter, effect one of either activating a filter to receive the multicast transmission or removing a filter to no longer receive the multicast transmission.

77. The method of claim 76, wherein the first communication is one of a message or a direct procedure call.

78. The method of claim 76 wherein the second communication includes at least one filter parameter for the multicast transmission.

79. The method of claim 76 wherein the second communication includes information usable by the receiver to determine at least one filter parameter for the multicast transmission.

80. An apparatus, comprising:
a memory device for storing a program; and
a processor in communication with the memory device, the processor configured for use with the program to:
detect a first communication generated by a client application for transmission to a server over a network, wherein the first communication comprises an address of a multicast group and one of either a request to join the multicast group to receive a multicast transmission or a request to leave the multicast group to no longer receive the multicast transmission;
in response to detecting the first communication, determine and retrieve, from a service information table in the client machine, a filter parameter needed to receive the multicast transmission, the service information table including filter parameters and filter status information indicating whether a filter is currently enabled; and
send a second communication from the client machine to a multicast receiver to, according to the retrieved filter parameter, effect one of either activating a filter to receive the multicast transmission or removing a filter to no longer receive the multicast transmission.

81. The apparatus of claim 80, wherein the first communication is one of a message or a direct procedure call.

82. The apparatus of claim 80 wherein the second communication includes at least one filter parameter for the multicast transmission.

83. The apparatus of claim 80 wherein the second communication includes information usable by the receiver to determine at least one filter parameter for the multicast transmission.

84. An apparatus, comprising:
means for detecting a first communication generated by a client application for transmission to a server over a network, wherein the first communication comprises an address of a multicast group and one of either a request to join the multicast group to receive a multicast transmission or a request to leave the multicast group to no longer receive the multicast transmission;
means for, in response to detecting the first communication, determining and retrieving, from a service information table in the client machine, a filter parameter needed to receive the multicast transmission, the service information table including filter parameters and filter status information indicating whether a filter is currently enabled; and
means for sending a second communication from the client machine to a receiver to, according to the retrieved filter parameter, effect one of either activating a filter to receive the multicast transmission or removing a filter to no longer receive the multicast transmission.

* * * * *